June 17, 1924.
H. G. LEVY
AGITATOR SHAFT
Filed April 17, 1922
1,498,392
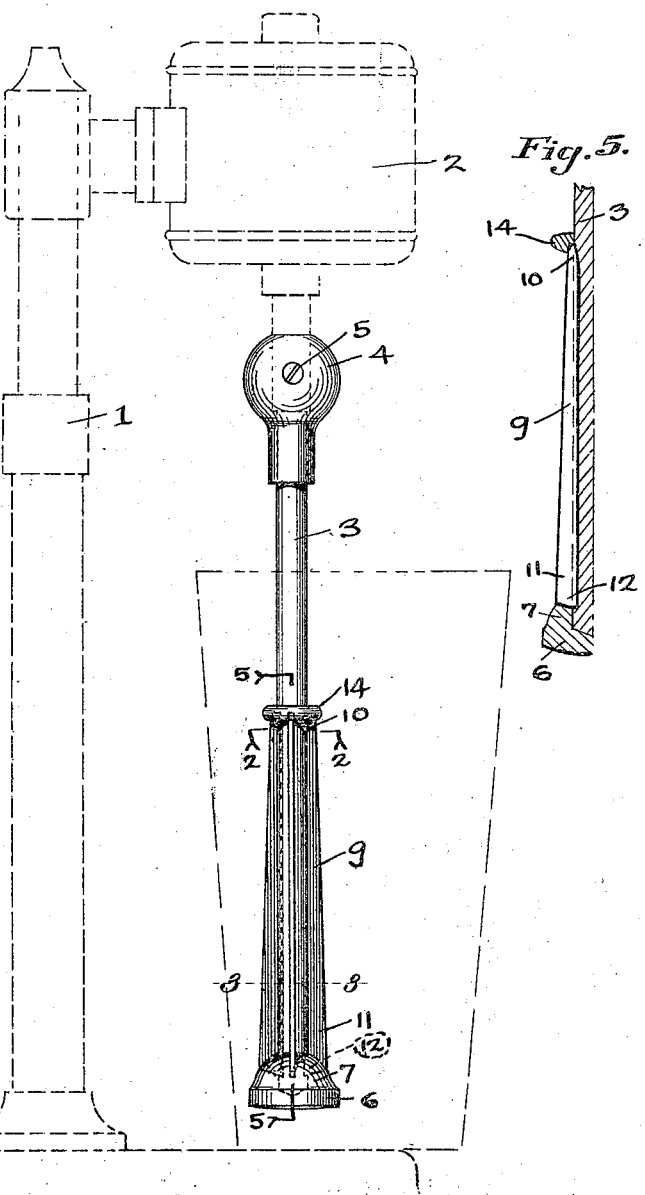
Inventor,
HENRI G. LEVY
By [signature]
attorney Patented June 17, 1924.

1,498,392

UNITED STATES PATENT OFFICE.

HENRI G. LEVY, OF SAN FRANCISCO, CALIFORNIA.

AGITATOR SHAFT.

Application filed April 17, 1922. Serial No. 554,177.

*To all whom it may concern:*

Be it known that I, HENRI G. LEVY, a citizen of the United States, and a resident of the city and county of San Francisco, California, have made a new and useful invention—to wit, Improvements in Agitator Shafts; and I do hereby declare the following to be a full, clear, concise, and exact description of the same.

This invention relates particularly to an agitator or dasher shaft for churning and mixing fluid and semi-solid substances and thoroughly aerating the same.

A further object of the invention is to provide an agitator shaft so arranged and constructed that it will be reinforced against bending or twisting strains and which will also prevent injury or damage to the drink mixer container by contact with the agitator shaft. Other objects and advantages will appear as this description progresses.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying one sheet of drawings:

Fig. 1 is a diagrammatical side elevation of an electrically operated drink mixer, having my agitator device thereon.

Fig. 2 is an enlarged plan section taken through Fig. 1 on the line 2—2.

Fig. 3 is a plan section taken through Fig. 1 on the line 3—3.

Fig. 4 is a bottom view of the agitator shaft shown in Fig. 1.

Fig. 5 is a vertical section taken through Fig. 1 on the line 5—5.

In detail, the construction, illustrated in the drawings, comprises a drink mixer standard 1, having a motor 2 mounted thereon and with the agitator shaft 3 secured to the commutator shaft of said motor. The electrical energy is led to the motor 2 in a conventional manner in conjunction with an operating means for controlling said motor.

The agitator shaft 3 is provided with a knobular projection 4 on the end thereof, into which the end of the motor commutator shaft may be detachably secured by the screw 5. The opposite end of the said shaft has a disc 6, preferably circular in form, arranged concentrically thereon. That portion of the disc 6, engaging the end of the agitator shaft, is shaped hemispherically as at 7 and at predetermined points therearound is suitably grooved or slotted. The periphery of the adjacent end of the agitator shaft, for a distance less than its full length and greater than one-half its length, is provided with grooves or depressions registering and corresponding with those in the disc 6. A plurality of vanes or projections 9 are adapted to be placed and rigidly mounted within the registering slots provided in the shaft and disc. The vanes 9 are of a lesser width at the upper end 10 than at the lower end 11, the said lower end 11 being provided with a pointed portion 12 on the end thereof, engaging with the grooves formed in the disc 6 to prevent a radial or outward movement of the said vanes. The vane ends 10 are curved to conform to the curvature of the ends of the milled slots or grooves in the shaft so that said vanes will contact with the bottom of said grooves throughout their entire length. A grooved, ring annulus 14 is adapted to be mounted about the shaft and to engage the ends 10 of said vanes and to be secured thereto and to said shaft, by a wedge-fit which is made permanent by either sweating or soldering. The vanes 9 are tapered so as to have the greatest width at the lower end, whereby when assembled on the agitator shaft the combined widths of the vanes and shaft at the lower end will be considerably greater than the corresponding width adjacent the vane ends 10. The length of radial projection of the vanes 9 from the shaft 3, at both the lower and upper ends thereof, is less than the outer rim faces of either the disc 6 or annulus 14. By having the greatest width of the agitator so arranged that it will lie in close proximity to the bottom of and eccentrically to the axis of the container in which the substances to be mixed are placed, a more thorough and efficient agitation and aeration is obtained. Aside from the efficient churning properties possessed by the enlarged end of the agitator shaft, it has a tendency, when rotating in the substances to be mixed, to draw or suck down relatively unmixed ingredients from the upper portions of the container, so that the entire volume of ingredients will be mixed with the same consistency. The greater the surface area of the agitator, the greater will be its displacement and consequently, the more efficient will be its agitating action. Experiments have determined that cylindrical agitator shafts are very inefficient for agitating or mixing purposes, for the reason that a surface is provided with which the ingredients to be mixed will not adhere. The rotary action of such a shaft throws the ingredients into a swirling mass around and away from the shaft. An agitator, which is provided with projections or vanes on the periphery thereof, in either a plural or single amount, when immersed in the substances to be mixed for a distance greater or less than the length of the projections formed on the said shaft, will thoroughly intermix, agitate and aerate said substances, by reason of the fluid coming into contact with and adhering to the projecting portions forming the irregular contour of the said shaft. The normal tendency of any fluid substance is to resist displacement and to remain in contact with the immersed projecting portions of the agitator shaft, from which it would be constantly repelled or thrown away. Actually, the substance unable to cling to the smooth surface of the shaft 3 would be struck or hit by the projecting portions on said shaft, creating an efficient intermixing or swirling action. The more agitation or disturbance created by the agitator shaft, the greater will be the aeration of the substances in the mixer and the more light and palatable, the substances created.

I have found that an agitator shaft of the character described prevents swirling of the substances mixed and consequent overflowing from the container and tends to so thoroughly intermix and agitate the said substances that the level thereof is kept well below the rim of the container.

The radial projection of both the disc 6 and annulus 14 from the shaft 3 is greater than the length of projection of the vanes 9, so that the disc or annulus portions of the agitator shaft might come in contact with a container in which the agitator would be revolved so that no damage or breakage could be caused, whereas, contact of the vane portions 9 of the said shaft with the said container might either damage or break the container or mar or destroy the said vanes.

Having thus described this invention, what I claim and desire to secure by Letters Patent is:

1. An agitator for fluid mixers comprising a shaft having a disc on an end thereof; a plurality of projections, arranged around said shaft adjacent said disc, of a lesser length than said shaft; and an annulus around said shaft and the ends of said projections.

2. An agitator for fluid mixers comprising a shaft having a disc on an end thereof; a plurality of projections, arranged around said shaft and abutting said disc, of a length less than the length of said shaft; and an annulus around said shaft secured to ends of said projections.

3. An agitator for fluid mixers comprising a shaft having a disc on an end thereof; an annulus around said shaft between the ends thereof; and a plurality of projections arranged around said shaft and interposed between said disc and annulus having a radial projection less than said disc and annulus.

4. An agitator for fluid mixers comprising a shaft having an annular disc on an end thereof; an annulus positioned around said shaft between the ends thereof; and a plurality of projections greater than one-half the length of said shaft, arranged therearound and interposed between said disc and annulus and having a radial projection less than said disc and annulus.

5. An agitator for fluid mixers comprising a shaft having a plurality of longitudinal grooves therein, less than the length of said shaft; an annular disc on the end of said shaft, having grooves therein registering with those in said shaft; an annulus around said shaft adjacent the groove ends terminating between the ends of said shaft; and a plurality of vanes, less than one-half the length of said shaft arranged on the grooves in said shaft and interposed between said disc and annulus.

6. A mixing device comprising in combination a prime mover and an agitator shaft connected to one end thereof, said shaft having a plurality of projecting shoulders therearound and tapering from an end of said shaft to a part of said shaft intermediate its ends, and an annular means to confine the shoulders onto said shaft.

7. A mixing device comprising in combination a prime mover and an agitator shaft connected to one end thereof, said shaft having a disc on an end thereof; and, a plurality of vanes, arranged around said shaft adjacent said disc, said vanes tapering in width from said disc to a part on said shaft between its ends, and annular means to confine the tapered ends of said vanes onto said shaft.

8. A mixing device comprising in combination a prime mover and an agitator shaft connected to one end thereof, said shaft having a disc on an end thereof; and a plurality of vanes, arranged around said shaft and abutting said disc, of a length less than the length of said shaft, the combined widths of said vanes and shaft at the disc end thereof being greater than the combined widths of said vanes and shaft adjacent the opposite ends of said vanes, and annular means to confine the tapered ends of said vanes onto said shaft.

9. A mixing device comprising in combination a standard having a platform thereon and a motor having an agitator shaft connected at one end therewith, said shaft being adapted to be disposed eccentrically to the axis of a container of articles to be mixed, mounted on said platform, a disc on the bottom end of said shaft; a plurality of vanes around said shaft and abutting said disc; and means to confine the opposite ends of said vanes onto said shaft.

In testimony whereof, I have hereunto set my hand at San Francisco, California, this 31st day of March, 1922.

HENRI G. LEVY.

In presence of—
LINCOLN JOHNSON.